March 19, 1929.   K. MARSCHEIDER ET AL   1,705,487
VALVE MECHANISM
Filed Feb. 18, 1926   3 Sheets-Sheet 3

INVENTORS
KARL MARSCHEIDER
BRUNO FRISCH
BY
Lotka, Kehlenbeck & Harley
ATTORNEYS

Patented Mar. 19, 1929.

1,705,487

UNITED STATES PATENT OFFICE.

KARL MARSCHEIDER AND BRUNO FRISCH, OF BERLIN-TEGEL, GERMANY, ASSIGNOR TO A. BORSIG G. M. B. H., OF BERLIN-TEGEL, GERMANY, A CORPORATION OF GERMANY.

VALVE MECHANISM.

Application filed February 18, 1926, Serial No. 89,076, and in Germany March 3, 1925.

This invention relates to valves especially adapted for heavy duty in large conduits through which a fluid under high pressure passes, and particularly to that type of valves in which a rotatable valve carrying member provided with a central fluid passage and carrying a valve or valves is actuated by a screw threaded spindle in such a manner that, in opening, the valves are first withdrawn from their seats and then the said member is rotated to bring the central passage in alignment with the conduit, while, in closing, the passage is brought out of alignment (preferably at right angles to the conduit) and the valves are subsequently forced to their seats. The actuation of the parts in the above order involves two movements which are usually imparted by turning continuously a hand wheel, or a gear, in one direction for opening, and in the reverse direction for closing. Because of the great pressure in the conduits with which valves of this type are used and the large size of the valves, it has been difficult to secure an actuating mechanism to impart the two movements required, which would not require a great amount of force to actuate the valve and which would at the same time cause the opening and closing movements to be accomplished quickly. The latter viz, quick opening, and especially quick closing, are of the utmost importance, because a delay in operating the valve may in some circumstances result in serious property damage and even loss of life.

It is the principal object of this invention to provide a new and improved construction for a valve of the type described in which the mechanism for actuating the valve and for rotating the valve carrying member may be quickly and easily operated with a minimum of effort. A further object is to provide a new and improved mounting for the valve carrying member which permits the valve to be assembled or dismantled with great facility.

Figure 1:
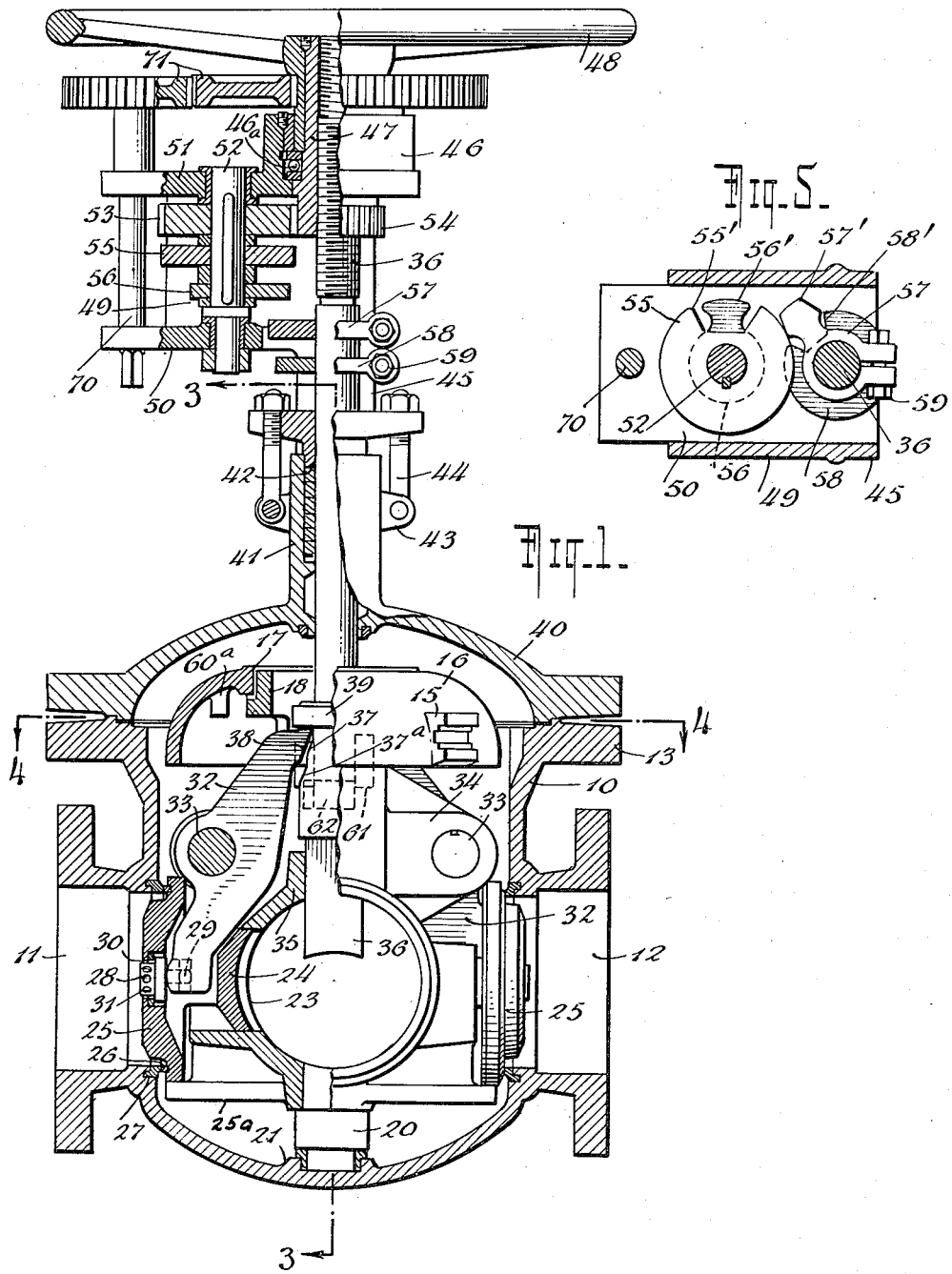
Figure 2:
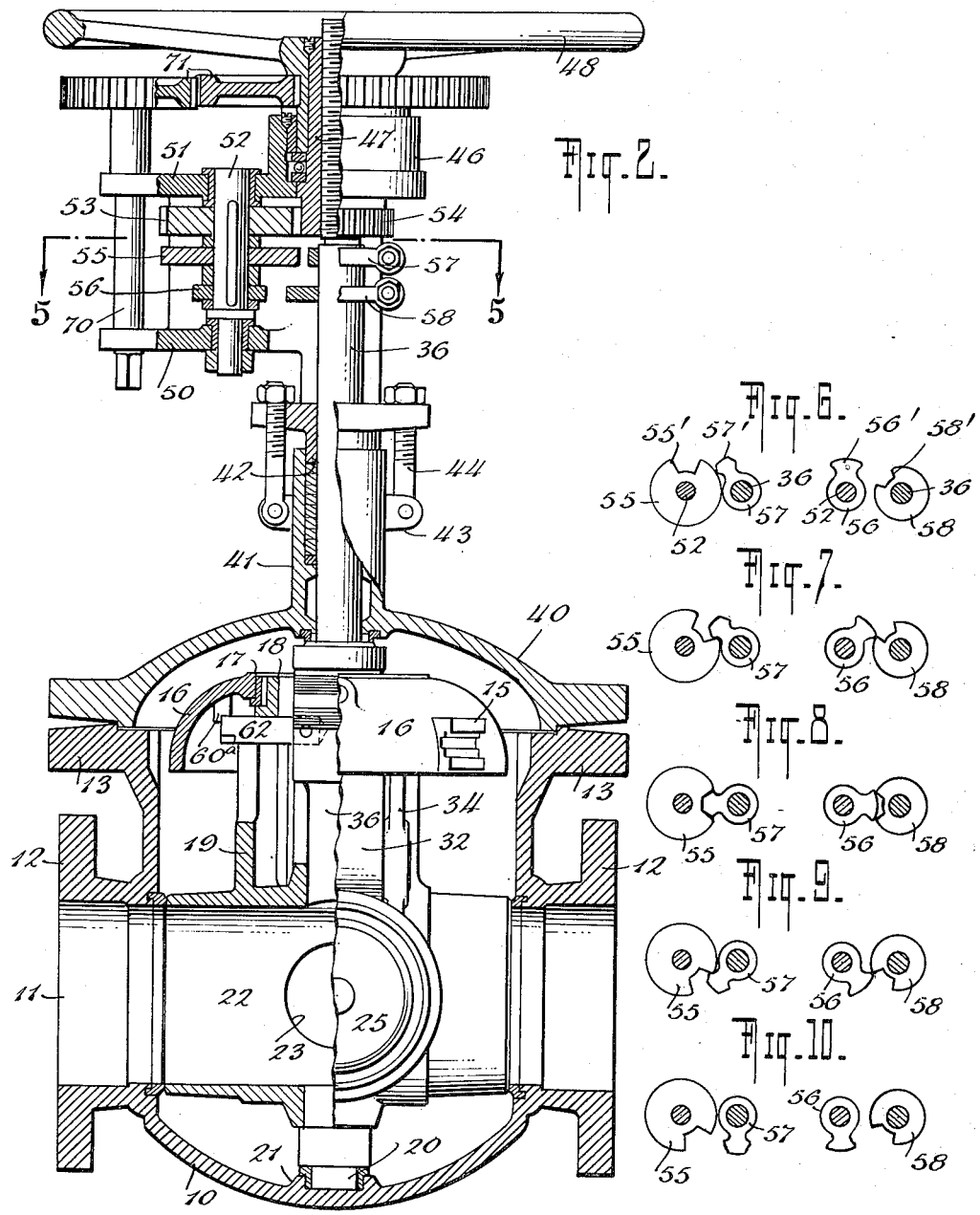
Figure 3:
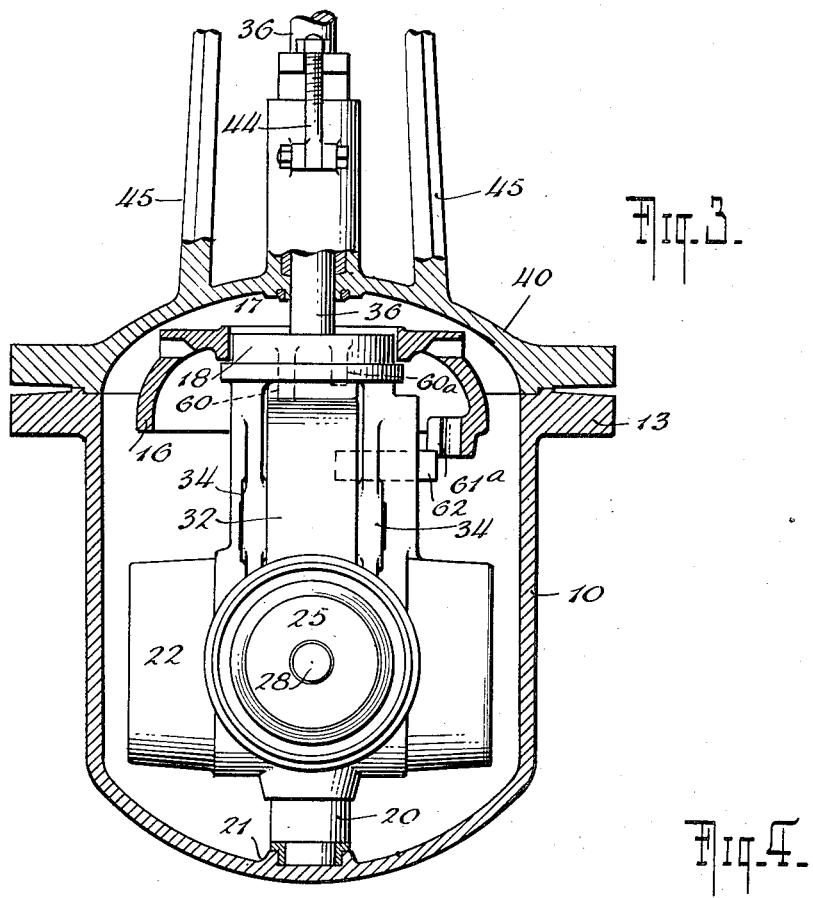
Figure 4:
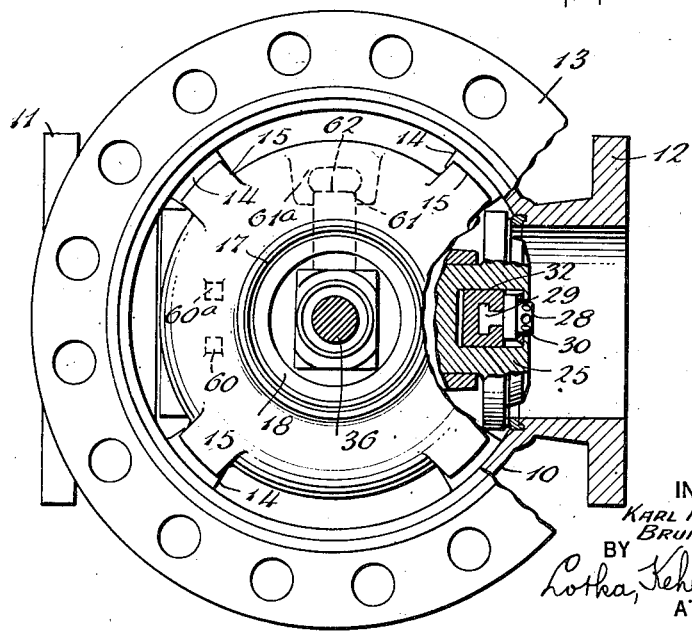

Other objects, such as the provision of a housing to enclose the actuating gearing, the provision of stops to limit the rotation of the valve carrying member, and the improvement of constructional details for securing greater strength and reliability of operation, will appear more fully from the following more detailed description and by reference to the accompanying drawings forming a part hereof in which Fig. 1 is a view partly in side elevation and partly in section of a valve constructed in accordance with the principles of my invention; Fig. 2 is a view similar to Fig. 1 showing a different position of the parts; Fig. 3 is a section on the line 3—3 of Fig. 1; Fig. 4 is a section on the line 4—4 of Fig. 1; Fig. 5 is a section on the line 5—5 of Fig. 1; and Figs. 6, 7, 8, 9 and 10 are views showing different positions of certain cams.

As shown in the drawings, the numeral 10 indicates the main casing of the valve which is provided with the flanged side openings 11 and 12, and top flange 13. Adjacent to the top flange, the casing 10 is provided with a plurality of inwardly projecting locking lugs 14 with which are engaged cooperating lugs 15 projecting outwardly from a bearing cap 16. The bearing cap 16, which, as will be readily understood, may be detachably locked by the lugs 14, 15, in the upper end of the casing 10, has a central bore 17 in which an upper trunnion 18 formed on a valve carrying member 19 is rotatably engaged. The lower end of the member 19 is provided with a trunnion 20 in axial alignment with the trunnion 18 and seated rotatably in a boss 21 of the casing 10.

Between the trunnions 18 and 20 and extending at right angles to the axis thereof, the valve carrying member 19 is provided with a fluid passage or conduit 22 adapted to be brought into, or out of, alignment with the flanged openings 11, 12, by mechanism presently to be described.

At the center of each side of the conduit 22, the member 19 is provided with a pair of axially aligned bores 23, each of which has slidably mounted therein the inner reduced end, or guide, 24 of a valve 25. As the valves 25 and the mechanism for operating them are similar in construction, a description of one will suffice for both. Each valve is provided with a seating ring 26, adapted to cooperate with a similar ring 27 fitted into the casing 10. In order to provide an additional guiding means for the valves, to insure that the seating rings 26 will align accurately with the rings 27 and to prevent the full weight of the valves from being borne by the reduced ends 24 thereof, we provide a rib or flange 25ª on the member 19 upon which the periphery of the valve 25 rests when the valve is opened. The major part of the weight of the valve is supported by the rib 25ª thereby relieving the guide 24 from supporting the entire weight of the valve and avoiding undue wear upon said guide with consequent sagging of the valve discs. The center of the valve 25 is bored for an auxiliary or relief valve 28 having a dovetailed tongue 29 at its inner end and a tubular extension 30 at its outer end, said extension 30 being provided with a plurality of apertures 31 so that the fluid in passing through the auxiliary valves will not pass directly across the valve seats. The tongue 29, which projects into an opening between the guide 24 and the valve, is engaged by the dovetailed lower end of a valve actuating lever 32. The lever 32 is pivotally mounted between its ends upon a pivot pin 33, which is supported in a pair of spaced apertured lugs 34, projecting from the side of the member 19.

Projecting from the upper face of the conduit 22 of the member 19 is a hollow boss 35 in which the lower end of an actuating spindle 36 is slidably but non-rotatably engaged. The spindle 36 has a pair of stepped inclined cam surfaces 37, 37ª, on its sides, for engagement with the inclined surfaces 38 provided at the upper ends of the levers 32, said inclined surfaces cooperating to move the levers 32 for opening the main and auxiliary valves 25, 28, when the spindle is moved upwardly. A collar 39 is secured to the spindle adjacent to the cam surfaces 37 and serves to actuate the levers 32 for closing the valves when the spindle is moved downwardly.

Secured to the top flange 13 of the casing 10 is a closing cap or bonnet 40, having a centrally located stuffing box 41, in which a packing gland 42 is mounted, said stuffing box being provided with laterally projecting lugs 43, to which are pivotally secured the stuffing box bolts 44.

Extending upwardly from the bonnet 40 is a pair of side webs 45 between the upper ends of which a bearing or journal 46 extends. Rotatably mounted in a ball, or other suitable, bearing 46ª nested in the journal 46, is an actuating nut 47 having a hand wheel 48 secured to the outer projecting end thereof. The upper end of the spindle 36 is screw threaded to engage with the nut 47, so that when the nut is rotated, the spindle will be moved upwardly or downwardly according to the direction of rotation of the hand wheel and nut. The side webs 45 have lateral extensions 49 connected at their lower and upper ends by the horizontally extending webs 50 and 51, the webs 49, 50 and 51 providing a housing for the spindle rotating mechanism.

The spindle rotating mechanism is constructed as follows: Mounted in suitable bearings provided in the horizontal webs 50 and 51, is a jack shaft 52, having a spur gear 53 secured thereto, which meshes with a spur gear 54 secured to the lower end of the actuating nut 47. A pair of cams 55, 56 is secured to the jack shaft 52 in spaced relationship immediately below the spur gear 53. Secured to the spindle 36 is a pair of cams 57, 58, these cams being spaced from each other on the spindle similarly to the spacing of the cams 55, 56 upon the jack shaft 52. Each of the cams 57, 58 is secured to the spindle 36 by a split sleeve adapted to be clamped in adjusted position upon the spindle by the clamping bolts 59. As shown in Fig. 2 of the drawing the cam 55 co-operates with the cam 57 and the cam 56 with the cam 58, the cams 55, 56 being the driving members and the cams 57, 58 the driven members. The cam 55 is provided with a re-entrant notch 55′ with which a projecting tooth 57′ of the cam 57 engages while the cam 56 is provided with a projecting tooth 56′ for engagement within a notch or recess 58′ in the cam 58, these cams cooperating to rotate the spindle in a manner presently to be described.

In order to limit the rotation of the spindle and to properly position the valve carrying member 19 for the open or closed condition of the valve, the bearing cap 16 is provided with two pairs of lugs or stops 60, 60ª, and 61, 61ª with which a pin 62, secured to, and projecting laterally from, the spindle 36, cooperates.

The manner of assembling the valve is as follows: The valves 25 having the auxiliary valves 28 inserted therein are mounted upon the valve carrying member 19 with the guides 24 in engagement with the axially aligned bores 23 of said member. The lower dovetailed ends of the levers 32 are engaged with the dovetailed tongues 29 of the relief valves 28, after which the pivot pins 33 are passed through the apertures of the levers and the lugs 34, to hold the levers in position. The valve carrying member is placed within the main casing 10 with the lower trunnion 20 of said member seated in the boss 21 of the casing, and the spindle with the pin 62 projecting therefrom, is inserted into the hollow boss 35 of the member 19. The bearing cap 16 is then inserted into the upper end of the casing 10, after which it is rotated to bring the lugs 14 and 15 into locked engagement, it being understood that the upper trunnion 18 of the member 19 is inserted within the central bore 17 of the bearing cap as the bearing cap is inserted into the valve casing. After the bearing cap has been locked in position, it will be seen that the valve carrying member 19 with the levers 32 secured thereto, is securely locked by the bearing cap in its rotatable position within the main casing 10, these parts and the spindle 36, which is also locked in position by the bearing cap, forming in effect an unitary assembly from which the upper assembly, consisting of the bonnet 40, and the actuating mechanism mounted thereon, may be readily removed without disturbing the member 19 from its mounting in the main casing. The parts which constitute the upper assembly, namely, the bonnet 40, stuffing box and packing gland, bearing 46ª, hand wheel 48, the jack staff, gears 53, 54, and cams 55, 56 may be assembled separately and now placed in position as a unit; or these parts may be assembled upon the bonnet after the bonnet has been placed on the spindle. In either case it will be understood that the cams 57, 58 will be placed upon the spindle between the stuffing box and journal 46 as the bonnet or upper assembly is being lowered upon the spindle.

After the upper assembly is properly located the valve spindle is rotated to its extreme positions of movement as determined by the engagement of the pin 62 with the stops 60 and 61 and the cams 57, 58 are clamped by the bolts 59 into their proper operative position.

The operation of the device is as follows: Assuming the parts to be in the position shown in Fig. 1, in which position it will be noted the valves 25, 28 are closed and the spindle 36 is in its lowermost position, if the actuating nut 47 is rotated by the hand wheel 48 or by other suitable mechanism the rotation of the nut will, because of its screw-threaded engagement with the spindle 36, cause the spindle to be moved upwardly. As the spindle moves upward, the uppermost inclined cam surfaces 37 will, by their engagement with the inclined surfaces 38 on the upper end of the levers 32, move the upper ends of the levers outwardly from the spindle a sufficient distance to cause the auxiliary valves 28 secured to the lower end of the levers to be unseated, thus permitting the fluid within the conduit to which the valve is connected to pass into the valve casing. As the spindle continues its upward movement, the inclined surfaces 38 at the upper end of the levers 32 engage with the straight vertical surfaces on the side of the spindle located between the inclined surfaces 37, 37ª thus effecting a dwell in the operation of the levers. During this dwell, the pressure of the steam admitted into the valve casing is prevented from building up because of the opening of the auxiliary valve 28 at the outlet side of the valve casing, consequently, when the cam surfaces 37ª begin to actuate the levers 32 the opening of the valve 25 is not resisted by an excessive pressure, such as would be the case if the relief or auxiliary valves were not provided.

During the first movement of the levers 32 the valves 28 only are opened, the lower end of the levers moving in the clearance spaces provided between the valves 25 and their guides 24, when however the inclined cam surfaces 37ª begin to act on the upper ends of the levers, the lower ends of the levers contact with the front walls of the guides 24 and begin to unseat the valves 25. At the time the valves 25 have reached their fully opened position, the pin 62, which has been moving between the guide way defined by the opposed faces of the lugs 61, 61ª, passes above the upper end of the lug 61ª. Simultaneously, the cams 57 and 58 come into alignment with the cams 55, 56; the driven cams 57, 58 having been so adjusted upon the spindle 36, that the driving cams 55, 56 which are being rotated by the gears 54, 53 will occupy approximately the angular positions, relatively to the driven cams, shown in Fig. 6.

As the rotation of the nut 47 continues, the tooth 56′ of the lower driving cam 56 engages within the recess 58′ of the lower driven cam thus causing the spindle 36 to be rotated. The driving action of the lower cams continues until the spindle has been rotated approximately 45° or until the recess 55′ of the upper driving cam 55 is engaged with the tooth 57′ of the upper driven cam 57, the latter tooth and recess continuing the rotation of the spindle until it has been turned through an angle of 90°, as shown in Figs. 6 to 10.

As above pointed out, the pin 62 moves above the upper face of the lug 61ª just at, or slightly before, the time the cams begin to be active to rotate the spindle, and, when the spindle is rotated through the 90° angle, the pin 62 is brought into contact with the lug or stop 60. It will be understood that when the pin 62 is engaged with the lugs 60, 60ª or 61, 61ª respectively, the valve carrying member 19 will be properly located to bring the conduit 22 in alignment with the valve opening, or the valves 25 in alignment with their valve seats.

During the closing movement of the valve the initial turning movement of the spindle is performed by the upper cams 55, 57 while during the opening movement the initial turning of the spindle is performed by the cams 56, 58. When the nut 57 is rotated to close the valve, the cams function to rotate the valve carrying body at the beginning of the rotation of the nut, a partial revolution of the nut serving to bring the valves 25 in alignment with their seats, while, during the opening of the valve the rotation of the member 19 is accomplished at the end of the rotation of the nut. In the initial closing movement as soon as the valves are brought to alignment with their seats, the velocity of the fluid passing through the valve casing will immediately move the valve 25 at the outlet side of the casing to its seat, thus shutting off the main flow, this closing movement of the valve being permitted by the clearance space between the valves 25 and guides 24 in which the lower ends of the levers 32 are located.

The rotation of the spindle to close the valve brings the pin 62 into contact with the lug 61 to stop the member 19 in its proper position and as the spindle is lowered by the further actuation of the nut, the pin passes between the opposed faces of the lugs 61, 61ª to hold the member 19 in correct alignment. The positive forcing of the valves 25 and 28 to their seats is accomplished by the pressure of the collar 39 upon the upper ends of the levers 32.

It will be noted that the cams 55, 56, 57, 58 form, in effect, an intermittent gearing, and, while we prefer, in order to obtain a structure of great strength, to employ a plurality of single toothed cams as shown it will be understood that many other types of intermittently operating devices might be employed.

The pivotal connection of the bolts for the packing gland enables the gland to be withdrawn for replacing the packing without necessitating the removal of the nuts from the bolts.

When it is desired to remove the bonnet 40 and upper assembly the bonnet bolts are taken out, the hand wheel 48 is removed and the cams 57, 58 are loosened; the nut 47 is then rotated to raise the bonnet and the parts carried thereby, until the screw threads of the nut disengage from the threads of the spindle; the upper assembly can then be lifted off the spindle, leaving the spindle in engagement with the valve carrying member, and the latter locked in position within the casing by the bearing cap 16.

The webs 50 and 51 which constitute the housing for the spindle rotating mechanism are preferably extended a sufficient distance to serve for mounting a counter shaft thereon, which is geared to the nut 47 for actuating the valve by power driven means. This arrangement is shown in Fig. 2 of the drawing the counter shaft being indicated by the reference numeral 70, and the driving gearing by the numeral 71. It will be understood that the valves is so constructed that the hand wheel 48 or power drive may be interchangeably employed, the nut having its upper end projecting beyond the bearings 46 and its outer circumference machined for the attachment of the power driven gear thereto, thus permitting both the hand wheel and power drive to remain connected to the nut at the same time.

With a valve constructed as hereinbefore described it will be seen that the closing and opening of the valve may be accomplished with a minimum expenditure of effort; the assembling and dismantling of the valve may be performed easily and in a comparatively short time; the valve may be either manually or power actuated; and the closing of the valve may be effected almost instantly to shut off the main flow.

While we have shown the valve unit as provided with a pair of valves 25 it will be obvious that the principles of construction herein disclosed are not limited to the use of a pair of valves but that such principles are equally applicable to a structure intended for use where the liquid flow is in one direction only and consequently where only a single valve 25 is needed. It will be therefore understood that where a pair of valves are set forth in any of the claims hereunto appended the claim is also intended to cover a construction in which only a single valve is employed.

It will be understood that many changes, variations and modifications may be resorted to without departing from the principles of our invention.

We claim:

1. A valve unit of the type comprising a casing having an outlet, a member rotatably mounted in said casing, said member having a valve movably mounted thereon and being provided with a through conduit, and a spindle for rotating said member to either of two positions in one of which said conduit is aligned with said outlet to establish communication through said casing and in the other of which said valve is aligned with said outlet, characterized by the provision of a jack shaft, and adjacent to said spindle, means to rotate said jack shaft, and intermittent gearing between said jack shaft and spindle for rotating said spindle and member to either of said positions.

2. In a valve unit, a main casing and a closing bonnet therefor, a valve carrying member mounted within said casing and a cap having a bearing in which said member is rotatably mounted, said cap and casing being provided with quick detachable, interengaging, locking devices for securing said cap detachably within said casing.

3. In a valve unit, a main casing and a closing bonnet therefor, a valve carrying member, and means to support said member rotatably within said casing, said means including a cap having a bearing in which said member is rotatably mounted, said cap and casing being provided each with a plurality of interengaging locking lugs for securing said cap detachably within said casing.

4. In a valve unit, a lower assembly comprising a casing, a valve carrying member rotatably mounted in said casing, a spindle connected with said member, and a cap detachably engaged with said casing to secure said member and spindle in said casing; and an upper assembly detachably secured to said casing and spindle, said upper assembly including a bonnet and a nut for actuating said spindle.

5. A valve unit as set forth in claim 4 in which the upper assembly includes means for intermittently rotating said spindle.

6. In a valve unit, a casing, a closing bonnet for said casing detachably connected to said casing, a valve actuating spindle carried by said bonnet and removable from said casing with said bonnet, a valve carrying member having a pair of trunnions mounted within said casing, said casing being provided with a journal in which one of said trunnions is rotatably mounted, and a cap, having a bearing for the other of said trunnions, detachably mounted within said casing and serving to hold said member in position within said casing when said bonnet and spindle are detached from said casing.

7. In a valve unit, a casing, a closing bonnet for said casing detachably connected to said casing, a valve actuating spindle carried by said bonnet and removable from said casing with said bonnet, a valve carrying member mounted within said casing, a spindle connected with said member, said member being provided with a pair of trunnions, said casing having a journal for one of said trunnions in axial alignment with said spindle, and a cap detachably mounted within said casing having a bearing for the other of said trunnions in axial alignment with said journal and spindle and serving to hold said member in position within said casing when said bonnet and spindle are detached from said casing.

8. In a valve unit, a casing, a combined valve carrying member and conduit rotatably mounted within said casing, a spindle connected with said member for sliding but non-rotative movement, relatively thereto, a rotatable nut for moving said spindle longitudinally, and intermittent means actuated by the rotation of said nut for rotating said spindle.

9. In a valve unit, a casing, a combined valve carrying member and conduit rotatably mounted within said casing, a valve movably mounted on said member, a spindle connected with said member for longitudinal sliding but non-rotative movement relatively to said member, a rotatable nut for moving said spindle longitudinally, means interposed between said spindle and valve for causing the longitudinal movement of said spindle to actuate said valve, and intermittently operative means connected with said nut and spindle for causing the rotation of said nut to rotate said spindle.

10. A valve unit as set forth in claim 9, in which the intermittently actuated means comprises cams actuated by the rotation of said nut and active at a predetermined point of the longitudinal movement of said spindle to cause a partial revolution of said nut to rotate said spindle.

11. A valve unit as set forth in claim 9, in which the intermittently actuated means comprises a jack shaft, and intermittently operative connections between said jack shaft, nut, and spindle.

12. A valve unit as set forth in claim 9, in which the intermittently actuated means comprises a jack shaft, gearing connecting said jack shaft and nut, and co-operating cams mounted on said jack shaft and spindle.

13. A valve unit as set forth in claim 9, in which the intermittently actuated means comprises a jack shaft, gearing connecting said jack shaft and nut, and co-operating cams mounted on said jack shaft and spindle, said cams being so located upon said jack shaft and spindle that they will be brought into co-operating alignment as the spindle approaches its upper limit of longitudinal movement.

14. A valve unit as set forth in claim 9, in which the intermittently actuated means comprises a jack shaft, gearing connecting said jack shaft and nut, and co-operating cams mounted on said jack shaft and spindle, said cams being constructed and arranged to cause a partial revolution of said nut to rotate said spindle through a predetermined angle in either direction according to the direction of rotation of said nut.

15. A valve unit as set forth in claim 9, in which the intermittently actuated means comprises a jack shaft, gearing connecting said jack shaft and nut, and co-operating cams mounted on said jack shaft and spindle, and the spindle cams being provided with means for clamping them in adjusted position on said spindle.

16. In a valve unit, a casing having an opening and a valve seat at said opening, a combined valve carrying member and conduit rotatably mounted in said casing, a valve mounted on said member for movement to and from said valve seat, a spindle connected with said member for longitudinal sliding but non-rotative movement relatively thereto, means actuated by the longitudinal movement of said spindle to cause said valve to be moved to or from said valve seat, a rotatable nut for moving said spindle longitudinally, means actuated by the rotation of said nut for causing a partial revolution of said nut to rotate said spindle and member when said valve is in substantially its fully opened position, and means to limit the rotation of said member and hold it in either of two positions, in one of which said valve is in alignment with said valve seat, and in the other said conduit is aligned with said opening.

17. In a valve unit, a casing having an opening and a valve seat at said opening, a combined valve carrying member and conduit mounted in said casing, a valve mounted on said member for movement to and from said valve seat, a spindle connected with said member for longitudinal sliding but non-rotative movement relatively thereto, means for rotating and moving said spindle longitudinally, means for actuating said valve by the longitudinal movement of said spindle, co-operating means secured to said spindle and casing to limit the rotation of said spindle and member and hold said member with said valve in alignment with said valve seat during the major portion of the longitudinal movement of said spindle, and with said conduit in alignment with said opening during a minor portion of said longitudinal movement.

18. In a valve unit, a casing having an opening and a valve seat at said opening, a combined valve carrying member and conduit rotatably mounted in said casing, a valve mounted on said member, a nut for moving said spindle longitudinally, means actuated by the longitudinal movement of said spindle for moving said valve into or out of engagement with said valve seat, and intermittently actuated means operated by a partial revolution of said nut to cause said spindle to rotate said member to a position in which said conduit is in alignment with said opening after said valve has been completely opened by the longitudinal movement of said spindle, and to rotate said member in the opposite direction to bring said valve into alignment with said valve seat by a partial revolution of said nut before the longitudinal movement of said spindle is effective to move said valve towards its seat.

19. In a valve unit of the type adapted for use with large conduits in which a fluid under high pressure passes, a casing having an inlet and an outlet, a pair of main valves for closing said inlet and outlet, a pair of relief valves movably mounted one on each of said main valves, a pair of actuating levers for said valves, connections between said levers and their respective valves, including a lost motion connection to the main valve, a spindle between said levers, co-operating cam surfaces on said spindle and levers, and means to actuate said spindle to cause said relief and main valves to be opened successively in opening said valve and to be closed in reverse order in closing said valve.

20. In a valve unit, a casing, a bonnet detachably mounted on said casing, a pair of upwardly extending transversely spaced webs on said bonnet, a stuffing box located between said webs centrally of said bonnet, a journal bearing extending between said webs at the upper ends thereof, a nut rotatably mounted in said bearing, a spindle in screw threaded engagement with said nut, a combined conduit and valve carrying member mounted for rotatation within said casing and to which said spindle is connected for longitudinal sliding but non-rotative movement relatively thereto, means for preventing rotation of said member and spindle except when said spindle is passing along a certain portion of its longitudinal movement, and means mounted on said webs and operatively connected with said spindle and nut for rotating said spindle through a predetermined angle when it reaches said certain portion of its longitudinal movement.

21. A valve unit as set forth in claim 20, in which the last mentioned means includes a jack shaft and intermittently operative devices connected thereto and to said spindle.

22. A valve unit as set forth in claim 20, in which the last mentioned means includes a jack shaft and gearing between said jack shaft, said nut, and said spindle, for intermittently actuating said spindle; and in which said webs are provided with lateral extensions which form a housing for said gearing.

23. A valve unit as set forth in claim 20, in which said webs are provided with lateral vertical extensions with horizontal webs connecting said extensions, said extensions and vertical webs defining a gear housing, and said horizontal webs serving as a mounting for the connection of power driven means for operating the valve.

24. A valve unit as set forth in claim 20, in which the stuffing box is provided with a packing gland and a pair of bolts pivotally connected thereto for swinging movement into or out of engagement with said packing gland.

25. A valve unit of the type comprising a casing having an outlet, a member rotatably mounted in said casing, said member having a valve movably mounted thereon and being provided with a through conduit, and a spindle for rotating said member to either of two positions in one of which said conduit is aligned with said outlet to establish communication through said casing and in the other of which said valve is aligned with said outlet, characterized by the provision of a guideway in said member, a reduced shank upon said valve slidably engaged within said guideway and a flange upon said member upon which the periphery of said movable valve is adapted to rest when said valve is in opened position, whereby the major portion of the weight of said valve is carried by said flange when said valve is opened.

26. In a valve unit, a main casing and a detachable closing bonnet therefor, said closing bonnet carrying a valve actuating spindle removable with said bonnet from said casing, a valve carrying member mounted within said casing and means to support said member rotatably within said casing, and detachably thereto, said means including a cap, additional to and unconnected with said bonnet, said cap being mounted within said casing and being detachably connected with it, and having a bearing in which said valve carrying member is rotatably mounted, said cap serving to hold said member in position within said casing when said bonnet and spindle are detached from the casing.

In testimony whereof we have hereunto set our hands.

KARL MARSCHEIDER.
BRUNO FRISCH.